(No Model.) 4 Sheets—Sheet 1.
L. B. GAYLOR.
VELOCIPEDE.
No. 433,562. Patented Aug. 5, 1890.
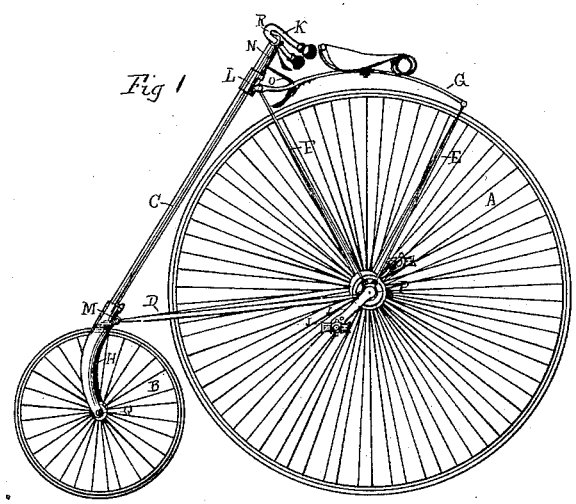
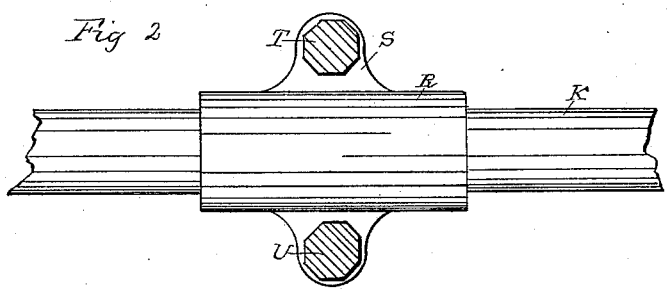
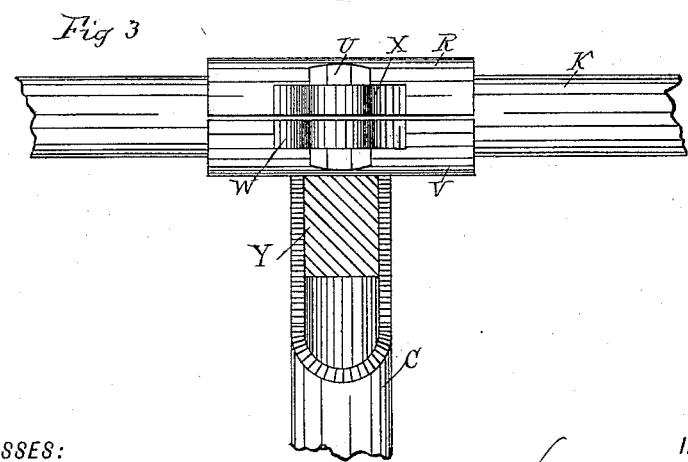
WITNESSES:
J. B. Rogers
George W. Borchers
INVENTOR
Leonard B Gaylor
BY Phillips Abbott
his ATTORNEY (No Model.) 4 Sheets—Sheet 2.
L. B. GAYLOR.
VELOCIPEDE.
No. 433,562. Patented Aug. 5, 1890.
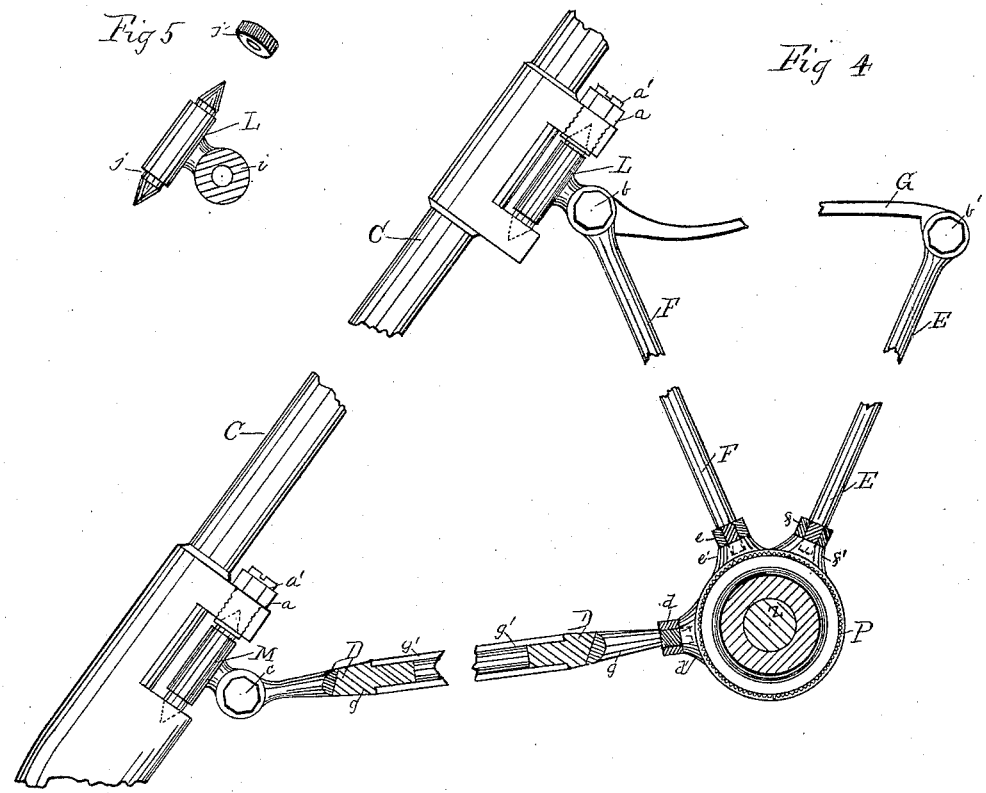
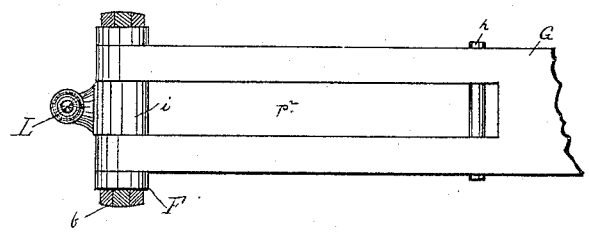

(No Model.) 4 Sheets—Sheet 3.

L. B. GAYLOR.
VELOCIPEDE.

No. 433,562. Patented Aug. 5, 1890.

WITNESSES:
S. B. Rogers
George W. Boerkers

INVENTOR
Leonard B Gaylor
BY Phillips Abbott
his ATTORNEY (No Model.) 4 Sheets—Sheet 4.

L. B. GAYLOR.
VELOCIPEDE.

No. 433,562. Patented Aug. 5, 1890.

WITNESSES:
S. B. Rogers
George W. Borchers

INVENTOR
Leonard B Gaylor
BY Phillips Abbott
his ATTORNEY

UNITED STATES PATENT OFFICE.

LEONARD B. GAYLOR, OF STAMFORD, CONNECTICUT.

VELOCIPEDE.

SPECIFICATION forming part of Letters Patent No. 433,562, dated August 5, 1890.

Application filed March 7, 1888. Serial No. 266,475. (No model.)

*To all whom it may concern:*

Be it known that I, LEONARD B. GAYLOR, a citizen of the United States, and a resident of Stamford, in the county of Fairfield and State of Connecticut, have invented certain new and useful Improvements in Bicycles, Velocipedes, &c., of which the following is a specification.

The present invention refers principally to that class of bicycles which are steered by a small front wheel and propelled by a large rear wheel, preferably driven by direct-acting crank-treadles, such bicycles being shown in United States Letters Patent No. 361,280, granted to me April 19, 1887.

This invention relates particularly to the mode of constructing this form of machine, and involves the novel constructions of the connections, bearings, adjustments, and various attachments necessary to make it practical and complete, as hereinafter set forth.

The form and method of constructing the framing used in machines of this class which have been driven by clutch and lever or other like devices, have been found unsuitable for these new bicycles because of their being too cumbersome and composed of an unnecessary number of parts to be used in connection with a simple crank motion. The description and drawings hereof describe and show a light and simple construction, which by actual test has proved practical in every way.

Like letters denote like parts in all the figures of the drawings.

Figure 7:
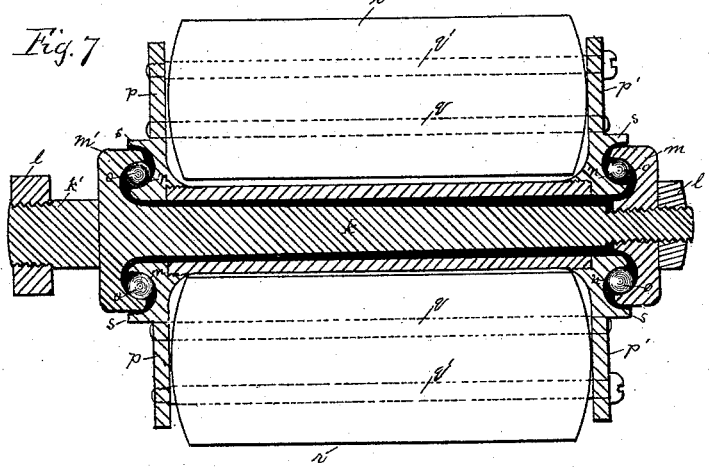
Figure 8:
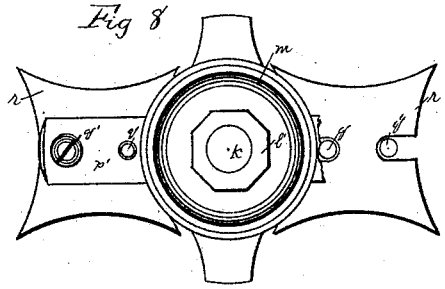
Figure 9:
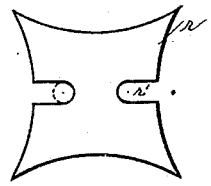
Figure 10:
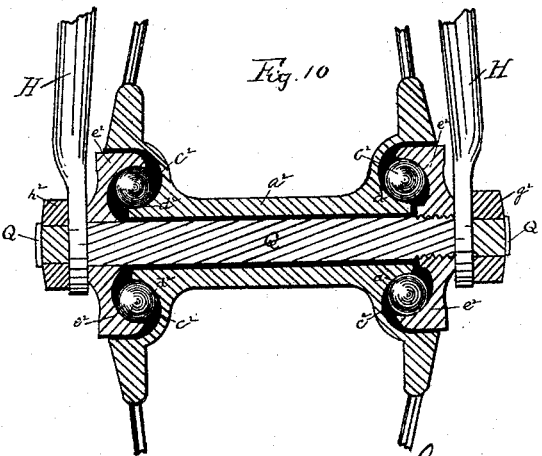
Figure 11:
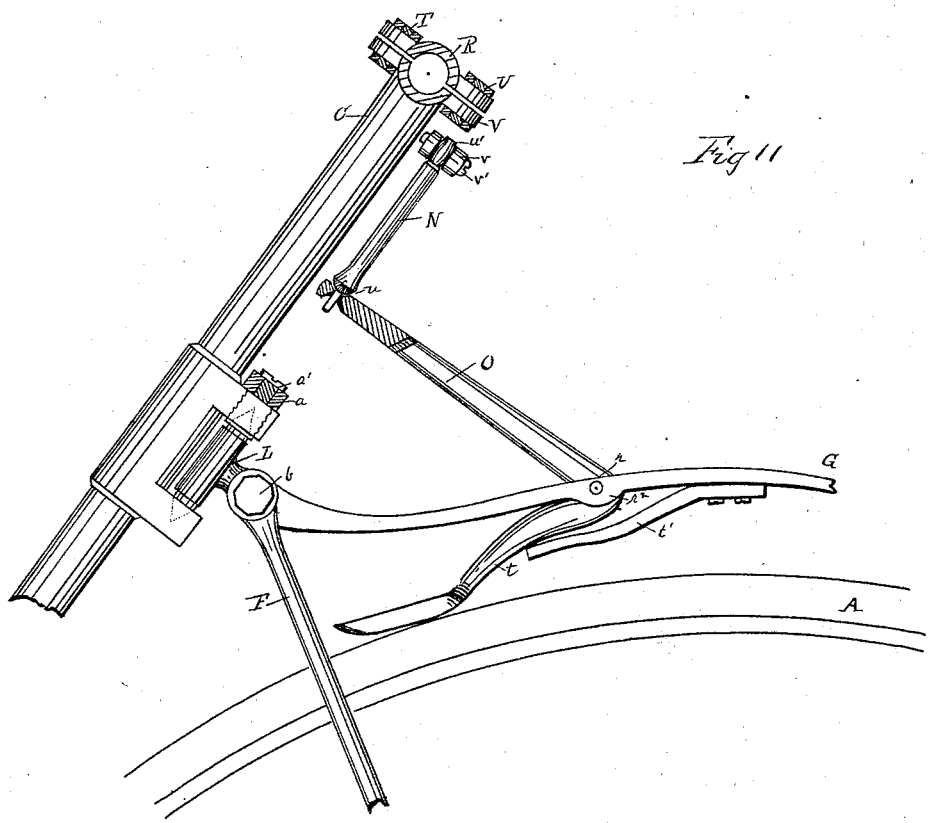
Figure 12:
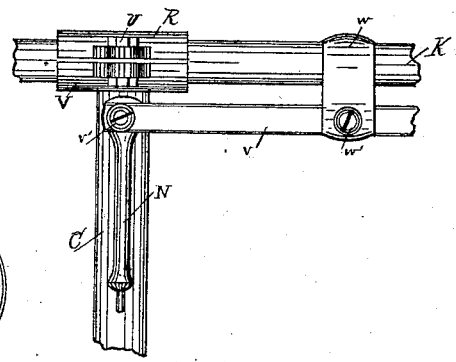
Figure 13:
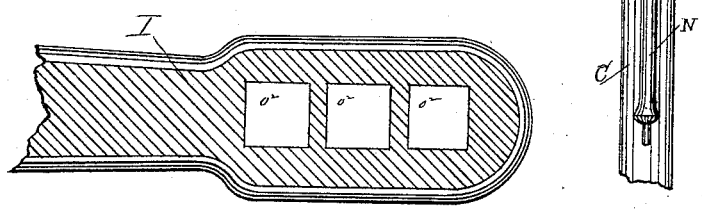

Figure 1 illustrates a side elevation of a machine embodying my inventions with all the parts in place. Fig. 2 illustrates a top plan view of the handle-bar connection. Fig. 3 illustrates a front view of the parts shown in Fig. 2, the steering-rod being partly in section. Fig. 4 illustrates a side view of portions of one-half of the frame partly in section and with portions broken out to reduce the size of this figure. Fig. 5 illustrates a side view of one of the cone-bearings. Fig. 6 illustrates a top view of the front end of the saddle-spring. Fig. 7 illustrates a horizontal section of my ball-bearing pedal. Fig. 8 illustrates an end plan view of one of the pedals, a part being removed to show the ends of the foot-rubber supporting-bars. Fig. 9 illustrates the outline of the foot-rubber. Fig. 10 illustrates a longitudinal vertical view, partly in section, of the ball-bearings for the small wheel. Fig. 11 illustrates a side plan view, a part being in section, of portions of the brake and adjoining devices. Fig. 12 illustrates a rear view of portions of the brake and adjoining devices. Fig. 13 illustrates a side view of the pedal end of one of the treadle-cranks.

The construction and operation of my improvements are as follows: Fig. 4 illustrates one side of the frame connected by adjustable cone-swivels to the oscillating steering-rod. Heretofore the frame of the machine in small front-steering-wheel bicycles has been made, as a rule, in two sections, the three main supports on each side coming together at a point usually a little above the hub of the large wheel and there welded together or otherwise permanently united. This construction I have found could be much improved upon, particularly for the style of machine described in my said patent, by making each part of the frame separate and joining each rod to the ball-bearing box by threading the inner ends and screwing them into the lugs $d'$ $e'$ $f'$, arranged on the bearing-box for that purpose, and securing them firmly in place by the jam-nuts $d$ $e$ $f$. It is often of great advantage in case of bending or breaking to be able to detach each separate part in order to straighten it or to replace it with a new part.

In order that the rod D may be of sufficient strength and still not be unnecessarily heavy, I construct it as shown in Fig. 4, $g'$ representing steel tubing of the necessary length attached by brazing or similar means to solid ends $g$. The rods F and E may be made in the same manner, or solid, as may be desired.

I have ascertained by practical experience that a rider on a machine of this form having, because of its peculiar construction, a firm foot-hold on the crank-pedals does not need a saddle-spring vibrating backward and forward to neutralize the jolts of the machine, as is the case in machines propelled by clutches, on which the treadle-levers offer very little support to the rider. On this machine, however, the rider puts much of his weight upon the cranks and receives most of the jar on his feet, thereby saving the machine a great deal of strain and allowing it to be built lighter and more rigid. I therefore attach the saddle-spring G directly from the end of the rod E to the lug $i$ of the swivel L and secure the rod F, the saddle-spring G, and the swivel L firmly together, all by the same bolt $b$, as illustrated in Figs. 4 and 6.

It will be noticed that in steering this machine the steering-rod C oscillates from side to side on the axis of the swivels L M, instead of turning in bearings on its own axis, as is the case in all other bicycles having the small wheel in front, excepting the bicycles shown in the United States Patent of Perkins, No. 309,086, of December 9, 1884, in which the steering-rod moves on the axis of the lower swivel (which is not adjustable) and on its own axis at the upper swivel, which is of entirely different construction from mine and is different in operation, because turning on different axes there is a tendency to twist the steering-rod. This produces strain on the swivels which tends to fracture. His rod, moreover, is curved between the swivels. My mode of connection acts perfectly in steering the machine, is easily adjusted by the screw-plug $a'$ and jam-nut $a$, more fully described in my said former patent, holds the parts rigid, and prevents any rattling.

In Fig. 5 I show an improved method of excluding dust from the swivel-bearings. A shoulder is formed on each end of the swivel, and a dust-excluding washer $j'$, made of felt, leather, or equivalent material, and punctured with a hole adapted to fit over the reduced end of the swivel and take a bearing on the shoulder $j$, is placed on the swivel. The thickness of the washer $j'$ is such that it will be subjected to slight compression between the shoulder $j$ and the lugs on the swivel-frame, or against the end of the screw-plug $a'$, as the case may be, thus effectively preventing dust from entering the bearings.

It has been customary heretofore in machines of this class to make the forks of the small wheel straight from about the top of the wheel to the axle. I make them of a new form by curving them downward and backward, thus adding to the beauty of the machine without interfering with its strength or rigidity, and I also secure the advantage of bringing the small wheel nearer the large one, and also avoid the angle-joint where the forks jam the steering-rod, at which place fracture is most apt to occur.

Fig. 3 illustrates a method of attaching the handle-bars K to the steering-rod C by making a box of two sections R V and clamping them together on the handle-bar K by bolts T U. The handle-bar is preferably made of one continuous piece, either tubular or solid. The lower section V of the box is made with a projection Y, which extends into the steering-rod C, and is brazed or otherwise fastened therein. Fig. 2 shows the box as looked upon from above.

The improvements in the brake, which are illustrated in Figs. 11 and 12, are important parts of my invention. As far as I am aware, in all machines of this class the brake-lever has been pivoted at some joint of the framing, usually on the transverse bolt holding such parts together. I pivot the brake-lever O in the saddle-spring G at a suitable distance back from the bolt $b$ by making the saddle-spring with a slot $p^2$ (see Fig. 6) and a lug $r^2$, in which the brake is secured by a pivot $h$. The brake-spoon $t$ is normally pressed back from the rim of the wheel A by a spring $t'$. In operating the brake the lever-arm O is pressed downward by a connecting-rod N, which is fitted at its lower end with a swivel $u$, which is shaped to allow the side-play necessary in the operation of the levers. It will also be noticed that the swivel $u$ is in axial line with the swivels L M of the steering-rod, so that the brake mechanism will act equally well in whatever position the steering-rod may be turned. The connecting-rod N is joined to the brake-handle $v$ by a screw $v'$, or by a bolt or pivot. The brake-handle operating in the lug $w$ is attached to the handle-bar K in the usual manner. All parts are kept in place by the pressure of a spring $t'$.

Fig. 13 represents the end of the crank I, made with three square apertures $o^2$, in which the square end K', Fig. 7, of the pedal-shaft is arranged to fit and be secured in place by the usual nut $l$.

Fig. 7 illustrates a ball-bearing pedal, which, although especially designed for this machine, may obviously be advantageously used on any other form of crank-driving bicycle. The action is just the reverse of that heretofore used. The grooves attached to the shaft are arranged to receive the outer side of the circle of balls $o$, instead of the inner side, as has before been customary. The groove $n\,n$, which has always been placed on the outer side, I place in the inner side, making plates $p\,p'$, with a projecting flange $s\,s$, which overlaps the boxes $m\,m'$, fitting closely but without contact, and protecting the running parts from dust without the aid of the felt dust-caps heretofore necessary on other forms of pedals, and which soon become saturated with oil and are undesirable.

I also use a pedal-rubber of a new form and with an improved method of securing it in place. This I illustrate in Figs. 7, 8, and 9. The rubber itself is shown in Fig. 9. It has four sides, each preferably curved in a corresponding arc of a circle. It is not essential, however, that the arcs should all be of exactly the same curvature. It has longitudinal grooves $r'$ on two sides. It is placed in position by first securing the rod $q$ firmly in place, then placing one grooved side of the rubber over it, passing the screw-rod $q'$ through the frame $p'$ and the remaining groove, which holds it tightly in place. The advantages of this form of rubber are as follows: It cannot turn over and allow the foot to slip. It is always in proper position to receive the foot, and by cutting the rubber away to form the grooves gives an elasticity to the points of contact, allowing them to yield readily to conform to the shape of the shoe. The old form of square rubbers or their equivalent, having only one rod running through their center, is quite as likely to have a corner presented upwardly as a flat side, and in mounting a bicycle by the pedal it is at the least annoying to have the foot slip an inch or more before a proper bearing is obtained. It is obvious that two or more holes may be made through the rubber lengthwise, instead of the open slots shown, in which case both of the rods $q$ and $q'$ will be thrust lengthwise through the rubber. I show in dotted circular line in Fig. 9 this construction on one side of the rubber.

Fig. 10 illustrates my improved form of ball-bearing as applied to the small wheel. Here its advantages are most apparent and of the greatest value. It is, as far as I am aware, the only bearing in which a fixed non-rotating axle is used, the bearing-grooves attached to said axle being acted upon by the outer side of the circles of balls. United States Patent No. 227,632 of Hughes is the nearest approach to this form known to me; but he uses a rotating axle, which revolves with the hub, and is only a modification of the form he designs for the large wheel. The great advantage of my bearing is the fact that the only places of contact—to wit, the edges $d^2$, attached to the rapidly-revolving portion $n$ $n$—are much the smaller in diameter and act on the inner side of the circle of balls. It will be observed that one revolution of this inner circle will cause only about one-half as much movement of the balls as one revolution of the outside box or groove would cause if it moved and the inner surface were stationary, as is the case now in all ball-bearings where a non-rotating axle is used, thus greatly reducing wear. It will, furthermore, be noticed that as the pressure and weight of the axle are downward and the sustaining pressure of the wheel upward, the balls are only under pressure as they in turn reach the upper arc of the circle, at which point they are the most separated and in position to act with the least possible friction.

In the constructions heretofore employed the pressure is on the balls when they rest in the lower arc and are huddled together by the weight of those above them and are too close for a free perfect action. Both sides are adjusted by turning the box $e^2$ and are held in place by tightening the nut $g^2$.

Having described my invention, I claim—

1. In a bicycle having a small front steering-wheel and a large rear driving-wheel, a framing composed of six separate rods which may be secured to or detached from the axle-bearing box by means substantially as described.

2. In a bicycle of the class described, the rods E, attached at their upper end to the rear of a firmly-fixed saddle-spring and at the lower end to the ball-bearing box by screw and jam nuts, whereby they may be readily detached from the rest of the framing, if required, substantially as set forth.

3. In a bicycle of the class described, the rods F, attached at their upper end to the forward end of the saddle-spring and swivel-lug $i$ by transverse bolt $b$ and at their lower end by screw and jam nuts to the ball-bearing box, whereby they may be separately detached from the rest of the framing, if required, substantially as set forth.

4. In a bicycle of the class described, the reach-rods D, attached at their forward end to an adjustable cone-bearing swivel and at their rear end by screw and jam nuts to a ball-bearing box arranged to be separately detached from the rest of the framing, if required, substantially as set forth.

5. In combination with the cone-bearing swivels and steering-rod mounted thereon and arranged to oscillate from side to side, the forks to contain the small wheel attached rigidly to the lower end of said steering-rod and curved downwardly and backwardly, substantially as set forth.

6. A box inclosing the ball-bearings provided with three lugs $d'$ $e'$ $f'$, in which to secure the rods D E F, substantially as set forth.

7. A swivel L, Fig. 5, having shoulders $j$, arranged to receive the felt dust-cap $j'$ and to hold the same in place, substantially as set forth.

8. In a pedal, a pedal-rubber supported between its end plates upon two parallel rods which pass lengthwise through it parallel with its center, but removed therefrom, whereby the rubber is supported and prevented from turning, substantially as set forth.

9. In a bicycle of the class described, the rods F, detachably attached at their upper end to the forward end of the saddle-spring and swivel-lug $i$ and at their lower end detachably attached to the bearing-box, whereby they may be separately detached from the rest of the framing, if required.

Signed at New York, in the county of New York and State of New York, this 3d day of March, A. D. 1888.

LEONARD B. GAYLOR.

Witnesses:
PHILLIPS ABBOTT,
S. B. ROGERS.